United States Patent
Park et al.

(10) Patent No.: US 10,698,070 B2
(45) Date of Patent: Jun. 30, 2020

(54) USER TERMINAL, VEHICLE, AND CONTROLLING METHOD OF VEHICLE

(71) Applicants: HYUNDAI MOTOR COMPANY, Seoul (KR); KIA MOTORS CORPORATION, Seoul (KR)

(72) Inventors: Jinwon Park, Seoul (KR); Seokgyu Kim, Seongnam-si (KR); Jeong-gi Yun, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/192,015

(22) Filed: Nov. 15, 2018

(65) Prior Publication Data

US 2020/0116815 A1    Apr. 16, 2020

(30) Foreign Application Priority Data

Oct. 12, 2018  (KR) .......................... 10-2018-121946

(51) Int. Cl.
| | |
|---|---|
| *G01S 5/00* | (2006.01) |
| *H04W 4/02* | (2018.01) |
| *H04W 4/40* | (2018.01) |
| *G01S 5/02* | (2010.01) |
| *G01S 11/04* | (2006.01) |
| *H04W 64/00* | (2009.01) |

(52) U.S. Cl.
CPC .......... *G01S 5/0072* (2013.01); *G01S 5/0252* (2013.01); *G01S 11/04* (2013.01); *H04W 4/027* (2013.01); *H04W 4/40* (2018.02); *H04W 64/003* (2013.01)

(58) Field of Classification Search
CPC ...... G01S 5/0072; G01S 5/0252; G01S 11/04; H04W 4/40; H04W 4/027; H04W 64/003
See application file for complete search history.

(56) References Cited

U.S. PATENT DOCUMENTS

| | | | |
|---|---|---|---|
| 6,386,007 B1* | 5/2002 | Johnson | .................... G01S 3/38 70/257 |
| 2011/0063076 A1* | 3/2011 | Kurtz | ...................... B60R 25/00 340/5.61 |
| 2012/0015690 A1* | 1/2012 | Miao | ................. H04M 1/72577 455/556.1 |
| 2016/0016526 A1* | 1/2016 | Louboutin | ............ H04W 4/021 701/2 |
| 2016/0156682 A1* | 6/2016 | Jeon | .................... H04L 65/1069 709/204 |
| 2017/0102697 A1* | 4/2017 | Hassan | ................ G05D 1/0016 |

* cited by examiner

*Primary Examiner* — Dinh Nguyen
(74) *Attorney, Agent, or Firm* — Brinks Gilson & Lione

(57) ABSTRACT

A user terminal, vehicle, and controlling method of vehicle is provided. The vehicle includes a communication module configured to communicate with a user terminal and a controller configured to acquire a location of the user terminal, which corresponds to a search signal, when the search signal is received from the user terminal and to determine, based on sensor information of the user terminal, whether the acquired location of the user terminal is valid when the sensor information of the user terminal is received from the user terminal.

13 Claims, 8 Drawing Sheets

USER TERMINAL, VEHICLE, AND CONTROLLING METHOD OF VEHICLE

CROSS-REFERENCE TO RELATED APPLICATION

The present application claims priority to and the benefit of Korean Patent Application No. 10-2018-0121946, filed on Oct. 12, 2018, which is incorporated herein by reference in its entirety.

TECHNICAL FIELD

Embodiments of the present disclosure relate to a user terminal, a vehicle, and a controlling method of the vehicle.

BACKGROUND

The statements in this section merely provide background information related to the present disclosure and may not constitute prior art.

A remote control system for a vehicle enables a driver to open/close a vehicle door and start the vehicle from the outside without having to insert a separate key into a key box or to perform a specific manipulation for starting the vehicle. A remote control device such as a portable smart card or a key fob for wireless communication is used.

Recently, in addition to the FOB key, a number of technologies using a handheld user terminal have been developed to control a vehicle. In the case of conventional technology for controlling a vehicle using a user terminal, the vehicle receives a search signal from the user terminal and estimates a location of the user terminal based on the search signal.

SUMMARY

Therefore, it is an aspect of the present disclosure to provide a user terminal configured to transmit a search signal to a vehicle, a vehicle capable of estimating a location of the user terminal, and a controlling method of the vehicle.

Additional aspects of the disclosure will be set forth in part in the description which follows and, in part, will be obvious from the description, or may be learned by practice of the disclosure.

In accordance with one aspect of the present disclosure, a vehicle includes a communication module configured to communicate with a user terminal and a controller configured to acquire a location of the user terminal, which corresponds to a search signal, when the search signal is received from the user terminal and to determine, based on sensor information of the user terminal, whether the location of the user terminal is valid when the sensor information of the user terminal is received from the user terminal.

The sensor information may include at least one of direction information and speed information of the user terminal.

The controller may identify the location of the user terminal based on an angle-of-arrival (AOA) of the search signal.

The communication module may receive a location of the user terminal, which corresponds to the search signal, from the user terminal, and the user terminal may identify the location of the user terminal based on an angle-of-departure (AOD) of the search signal.

When the search signal is received from the user terminal, the controller may transmit a response signal for requesting for the sensor information to the user terminal.

When a first search signal is received from the user terminal, the controller may acquire a first position of the user terminal, which corresponds to the first search signal, when a second search signal is received, the controller may acquire a second location of the user terminal, which corresponds to the second location, and the controller may determine whether the second location is valid based on the first location and the sensor information.

The controller may determine displacement of the second location relative to the first location and may determine whether the second location is valid based on the displacement of the second location and the sensor information.

When a direction of the displacement of the second location does not match the sensor information, the controller may determine that the second location is noise.

When a size of the displacement of the second location does not match the sensor information, the controller may determine that the second location is noise.

When it is determined that the location of the user terminal is valid and the location of the user terminal is inside the vehicle, the controller may transmit a termination signal to the user terminal.

In accordance with another aspect of the present disclosure, a user terminal includes a terminal communication unit configured to transmit a search signal to a vehicle, a sensor configured to sense movement of a user, and a terminal controller configured to generate sensor information including at least one of direction information and speed information based on the sensed movement of the user and to transmit the sensor information to the vehicle when a response information corresponding to the search signal is received from the vehicle.

The terminal controller may identify a location of the user terminal, which corresponds to the search signal, based on an AOA of the search signal and may control the terminal communication unit to transmit the identified location of the user terminal to the vehicle.

When the response signal is received, the controller may turn on the sensor.

The sensor may include at least one of an acceleration sensor and a gyro sensor.

The user terminal may further include an input configured to receive a learning command from the user, wherein, when the leaning command is input or the response signal is received, the terminal controller generates a learning pattern based on the movement of the user sensed for a preset time.

The user terminal may further include a storage, wherein the terminal controller stores the generated learning pattern therein.

When the response signal is received, the terminal controller may confirm whether the sensed movement matches the learning pattern, and when the sensed movement matches the learning pattern, the terminal controller may generate the sensor information based on the learning pattern.

In accordance with another aspect of the present disclosure, a controlling method of a vehicle includes: receiving a search signal from a user terminal; acquiring a location of the user terminal, which corresponds to the search signal; receiving sensor information of the user terminal from the user terminal; and determining, based on the sensor information, whether the acquired location of the user terminal is valid.

The controlling method may further include transmitting a response signal for requesting for the sensor information to the user terminal when the search signal is received from the user terminal.

The acquiring of the location of the user terminal may include identifying the location of the user terminal based on an AOA of the search signal.

The acquiring of the location of the user terminal may include receiving the location of the user terminal identified, based on an AOD of the search signal, from the user terminal.

The acquiring of the location of the user terminal may include identifying a first location of the user terminal, which corresponds to a first search, when the first search signal is received and identifying a second location of the user terminal, which corresponds to a second search signal, when the second search signal is received and the determining of whether the acquired location of the user terminal is valid may include determining whether the second location is valid based on the first location and the sensor information.

The determining of whether the acquired location of the user terminal is valid may include determining displacement of the second location relative to the location and determining whether the second location is valid based on the displacement of the second location and the sensor information.

The determining of whether the acquired location of the user terminal is valid may include determining that the second location is noise, when a direction of the displacement of the second location does not match the sensor information or when a size of the displacement of the second location does not match the sensor information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. The present specification does not describe all elements of embodiments, and common knowledge in the technical field to which the present disclosure pertains or the same descriptions of the embodiments will be omitted. The term "unit," "module," "member," or "block" may be implemented by using hardware or software. According to embodiments, one component may be implemented by a plurality of "units," "modules," "members," or "blocks," or one "unit," "module," "member," or "block" may include a plurality of components.

Throughout this specification, when a part is referred to as being "connected" to another part, the two parts may not only be directly connected but may also be indirectly connected, and an indirect connection includes a connection via a wireless communication network.

When a part is referred to as "including" a component, other components are not excluded therefrom and may be further included unless specified otherwise.

The terms "first," "second," etc. are used to distinguish one component from other components, and components are not limited by the terms.

An expression in the singular form includes the plural form unless explicitly stated otherwise.

Identification numbers of respective steps are used for convenience of description, and do not describe a sequence of the respective steps. The respective steps may be carried out in a sequence different from that described unless a particular sequence is specified.

Hereinafter, operating principles and embodiments of the present disclosure will be described with reference to the accompanying drawings.

Figure 1:
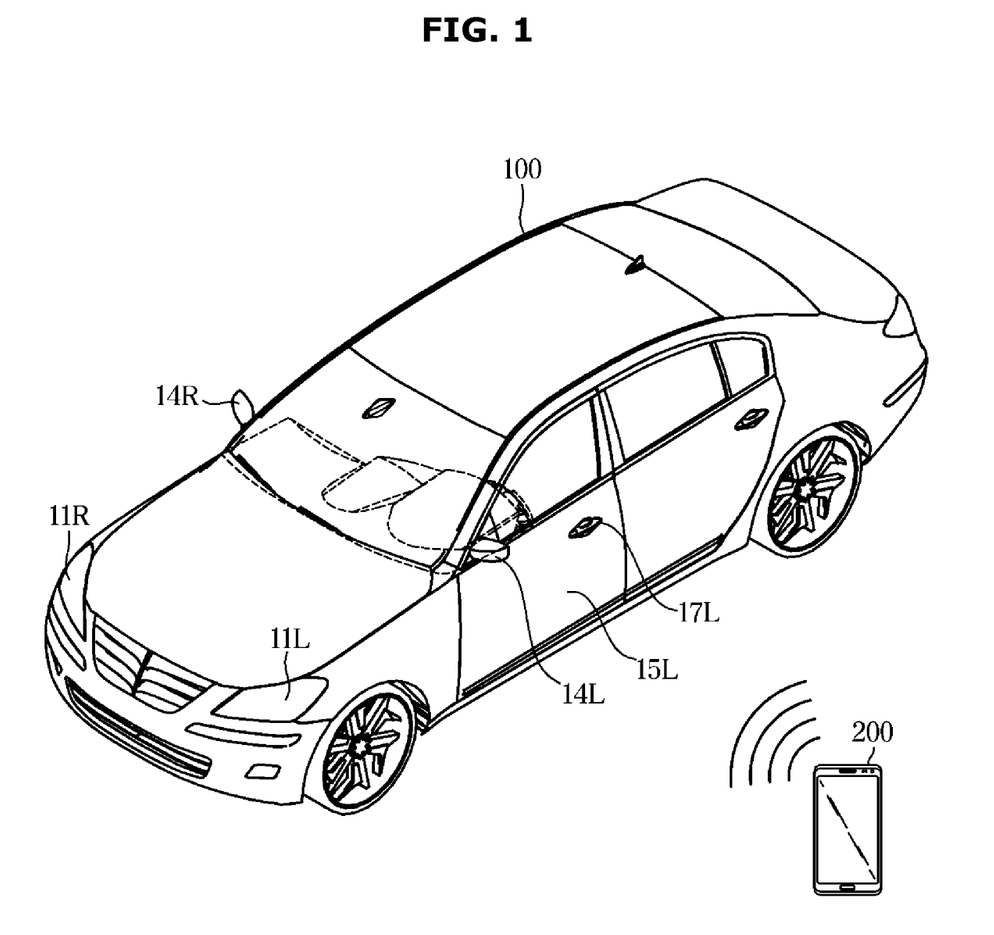
FIG. 1 is a diagram illustrating a relationship between a vehicle and a user terminal in one form of the present disclosure.

FIG. 1 is a diagram illustrating a relationship between a vehicle and a user terminal in accordance with one embodiment.

Referring to FIG. 1, a vehicle 100 in accordance with one embodiment may receive a search signal from a user terminal 200 to provide various user convenience functions such as remote control of the user through the user terminal 200.

For example, when a touch sensor of a door 15L or 15R senses a touch input of a user in a state in which the user holds the user terminal 200 registered in the vehicle 100, the vehicle 100 may perform authentication together with the user terminal 200 through a wireless communication. When the authentication is completed, a door lock of the vehicle 100 may be released. Thus, the user may pull a knob 17L or 17R to open the door 15L. Here, the user includes not only a driver but also a passenger who sits in the vehicle 100 and means a person who holds the user terminal 200.

In addition, when it is confirmed that the user terminal 200 approaches the vehicle 100, the vehicle 100 may provide a welcome light function to turning on a lamp provided in a leadlight 11L or 11R or the knob 17L or 17R of the vehicle 100.

In order to provide the various user convenience functions, the vehicle 100 may receive a search signal from the user terminal 200 and may identify a location of the user terminal 200 based on the received search signal.

The vehicle 100 and the user terminal 200 may be connected through a local area network. Herein, the local area network may include wireless LAN, Wi-Fi, Bluetooth, Zigbee, Wi-Fi direct (WFD), ultra wideband (UWB), and infrared data association (IrDA), Bluetooth low energy (BLE), near field communication (NFC), and radio frequency identification (RFID), but the present disclosure is not limited thereto.

On the other hand, the user terminal 200 may be implemented as a computer or a portable terminal accessible to the vehicle 100 through a network. Here, the computer may include, for example, a notebook, a desktop, a laptop, a tablet personal computer (PC), a slate PC, and the like, which are installed with a web browser. The portable terminal may be a wireless communication device with portability and mobility and may include all types of handheld wireless communication devices such as a personal communication system (PCS), a global system for mobile communication (GSM), a personal digital cellular (PDC), a personal handyphone system (PHS), a personal digital assistant (PDA), an international mobile telecommunication (IMT)-2000 terminal, a code division multiple access (CDMA)-2000 terminal, a Wideband-CDMA (W-CDMA) terminal, and a wireless broadband internet (WiBro) terminal and may include wearable devices such as a watch, a ring, a bracelet, an ankle bracelet, a necklace, glasses, a contact lens, and a head-mounted-device (HMD).

Figure 2:
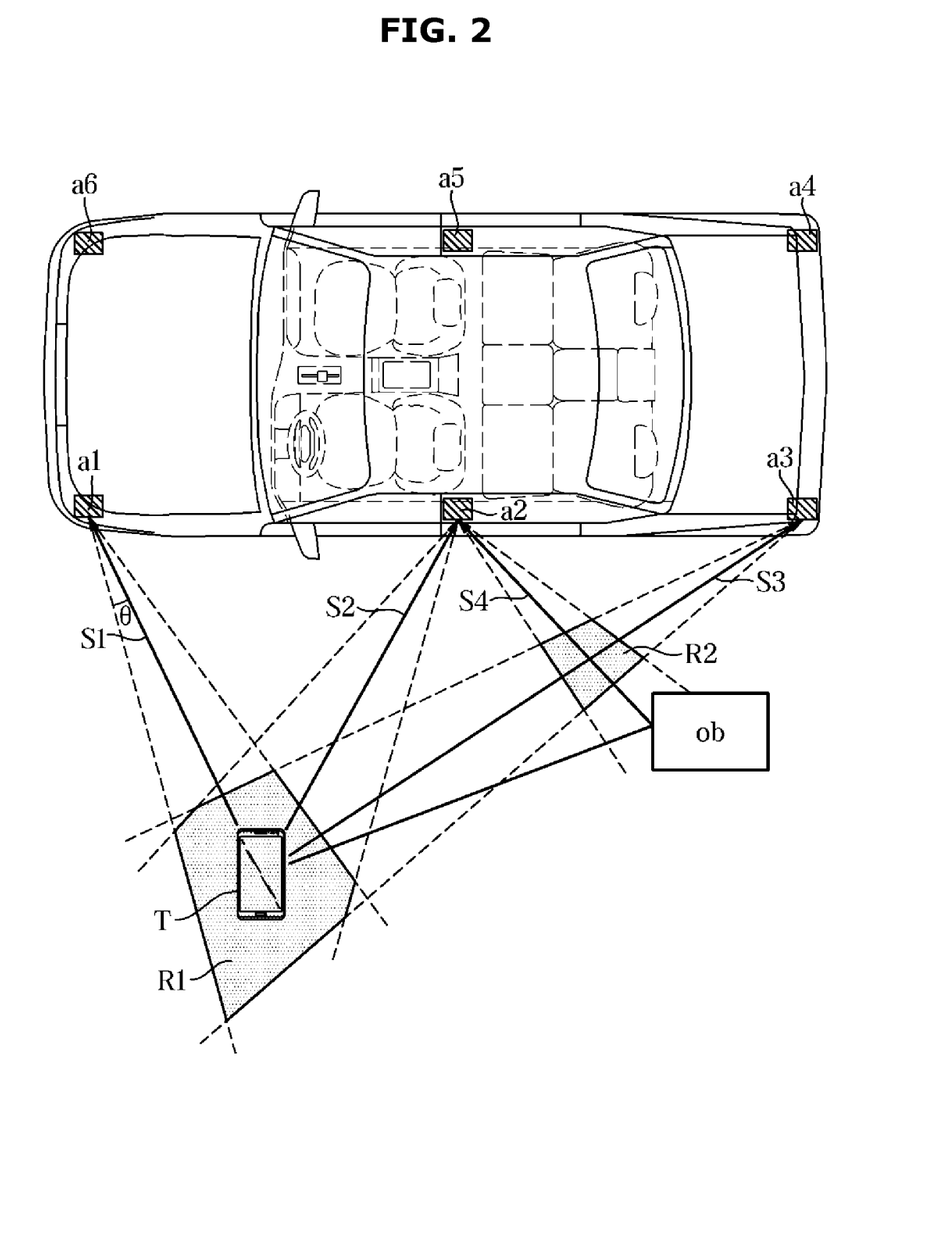
FIG. 2 is a diagram illustrating operation of a vehicle in accordance with the prior art.

FIG. 2 is a diagram illustrating operation of a vehicle in accordance with the prior art.

Referring to FIG. 2, the vehicle in accordance with the prior art may include a plurality of communication modules a1, a2, a3, a4, a5, and a6.

The vehicle may estimate a location of a user terminal T based on an angle-of-arrival (AOA) of each of search signals S1, S2, S3, and S4 received from the user terminal T by the plurality of communication modules a1, a2, a3, a4, a5, and a6.

However, there is an error (8) in location estimation using the AOA. Commonly, an error of about 10° (i.e., in a range of −5° to 5°) exists in one AOA value. Therefore, the estimated location of the user terminal T may have an error range R1, and a size of the error range R1 is directly related to accuracy of location estimation technology.

Conventionally, there has been an attempt to reduce the error range R1 by mounting more communication modules a1, a2, a3, a4, a5, and a6. However, this has a problem in that costs are high.

In addition, when there is a search signal S4 reflected by an obstacle ob, an AOA of the search signal S4 generates a separate error range R2 which lowers accuracy of an estimated location.

Hereinafter, a vehicle configured to more accurately estimate a location of a user terminal, and the user terminal in accordance with one embodiment will be described.

Figure 3:
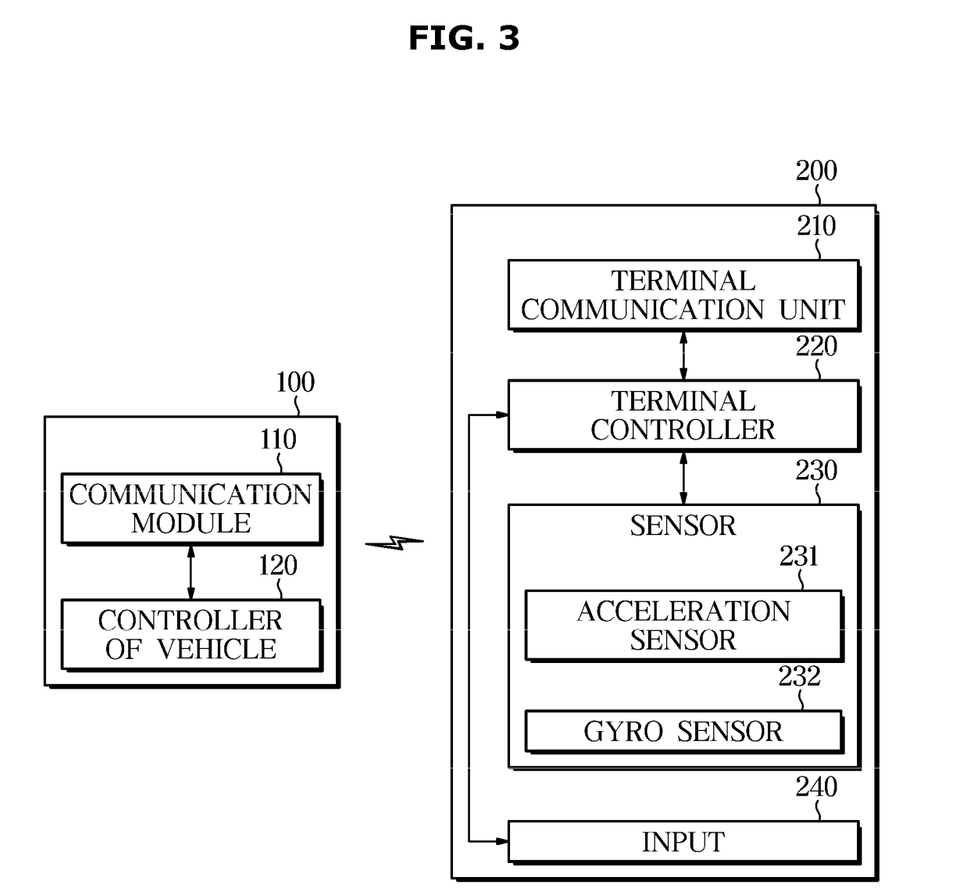
FIG. 3 is a control block diagram illustrating a vehicle and a user terminal in one form of the present disclosure.

FIG. 3 is a control block diagram illustrating the vehicle and the user terminal in accordance with the embodiment.

Referring to FIG. 3, a vehicle 100 in accordance with one embodiment may include a communication module 110 configured to communicate with a user terminal 200 and a controller 120 configured to control overall components of the vehicle 100, The communication module 110 may communicate with the user terminal 200, may receive various signals including a search signal from the user terminal 20, and may transmit various signals related to the vehicle 100 to the user terminal 200.

To this end, the communication module 110 may include various local area communication modules, such as a Bluetooth module, an infrared communication module, a radio frequency identification (RFID) communication module, a wireless local access network (WLAN) communication module, an NFC communication module, and a Zigbee communication module, which transmit and receive a signal using a wireless communication network in a local area. For example, the communication module 110 may be described as the Bluetooth module.

For example, the communication module 110 may be implemented as a Bluetooth module based on Bluetooth 4.0 (Bluetooth low energy (BLE)). The communication module 110 may communicate with the user terminal 200 using a radio frequency. In this case, the communication module 110 may receive a search signal from the user terminal 200, and the search signal may be an advertising packet. However, the present disclosure is not limited thereto.

In addition, a plurality of communication modules 110 may be provided in the vehicle 100, and the plurality of communication modules 110 may receive a plurality of search signals.

Furthermore, the communication module 110 may receive sensor information from the user terminal 200. In this case, the sensor information may include at least one of direction information and speed information of the user terminal 200 and may also include velocity information. Such sensor information may be used as a control basis of the controller 120.

In addition, the communication module 110 may receive a location of the user terminal 200 from the user terminal 200.

To this end, the communication module 110 may include a wireless communication interface including an antenna and a receiver, which receives at least one of the sensor information, the search signal, and the location of the user terminal 200. Furthermore, the communication module 110 may further include a signal conversion module configured to demodulate an analog type wireless signal, which is received through the wireless communication interface, into a digital control signal.

The controller 120 may control an entirety of various components including the communication module 110 in the vehicle 100 and may generate control signals for controlling various components in the vehicle 100.

When the controller 120 receives a search signal from the user terminal 200, the controller 120 may control the communication module 110 to transmit a response signal for requesting sensor information to the user terminal 200.

In addition, the controller 120 may identify a location of the user terminal 200 based on the search signal received from the user terminal 200. In addition, when the plurality of communication modules 110 are provided, the controller 120 may identify the location of the user terminal 200 based on a plurality of search signals received from the plurality of communication modules 110.

Specifically, the controller 120 may identify the location of the user terminal 200 based on an AOA of a search signal. In addition, the controller 120 may identify the location of the user terminal 200 using intensity, a time-of-arrival (TOA), and a time difference-of-arrival (TDOA) of the search signal. The controller 120 may also identify the location of the user terminal 200 using a Zigbee, RFID, or GPS signal or the like.

For example, when the controller 120 identifies the location of the user terminal 200 based on the AOA of the search signal, the controller 120 may use a triangulation method to estimate the location of the user terminal 200.

Alternatively, the controller 120 may receive the location of the user terminal 200 from the user terminal 200. To this end, the user terminal 200 may identify the location of the user terminal 200 based on the search signal and may transmit the identified location of the user terminal 200 to the vehicle 100. In this case, the user terminal 200 may identify the location of the user terminal 200 based on an angle-of-departure (AOD) of the search signal, but the present disclosure is not limited thereto.

In other words, the controller 120 may receive the location of the user terminal 200 from the user terminal 200 or may identify the location of the user terminal 200 based on the search signal received from the user terminal 200 so that the location of the user terminal 200 is acquired.

In addition, the controller 120 may determine whether the acquired location of the user terminal 200 is valid. The controller 120 may determine whether the location of the user terminal 200 is valid based on the search signal received from the user terminal 200. This will be described in detail later.

When it is determined that the acquired location of the user terminal 200 is valid, the controller 120 may confirm a distance between the vehicle 100 and the user terminal 200 based on the valid location of the user terminal 200. When the distance between the vehicle 100 and the user terminal 200 is within a preset reference distance, the controller 120 may approve vehicle control of the user terminal 200.

In addition, the controller 120 may confirm whether the location of the user terminal 200, which is determined to be valid, is within the vehicle 100. When it is confirmed that the user terminal 200 is located within the vehicle 100, the controller 120 may transmit a termination signal to the user terminal 200.

To this end, the controller 120 may be implemented using a memory (not shown) configured to store data on an algorithm for controlling operations of components in the vehicle 100 or store data on a program for reproducing an algorithm, and a processor (not shown) configured to execute such an operation using the data stored in the memory. In this case, each of the memory and the processor may be implemented as a separate chip. Alternatively, the memory and the processor may be implemented as a single chip.

The memory may be implemented as at least one of a non-volatile memory device such as a cache, a read-only memory (ROM), a programmable ROM (EPROM), an erasable programmable ROM (EPROM), or an electrically erasable programmable ROM (EEPROM), and a flash memory, a volatile memory device such as a random access memory (RAM), and a storage medium such as a hard disk drive (HDD) or a CD-ROM. However, the present disclosure is not limited thereto. The memory may be a memory implemented as a chip separate from the processor and may be implemented as a single chip together with the processor.

The controller 120 may be implemented as an electronic control unit of the vehicle 100.

The user terminal 200 in accordance with the embodiment may include a terminal communication unit 210, a terminal controller 220, a sensor 230, and an input 240.

The sensor 230 may sense movement of a user, that is, movement of the user terminal 200.

The sensor 230 may sense a moving direction, moving speed, acceleration, and the like of the user. Measured values sensed by the sensor 230 may be transmitted to the terminal controller 220.

Alternatively, the sensor 230 may sense sensor information including at least one of direction information and speed information of the user terminal 200.

To this end, the sensor 230 may include at least one of an acceleration sensor configured to sense acceleration information and a gyro sensor configured to sense posture information.

The terminal communication unit 210 may communicate with the vehicle 100 and transmit a search signal or sensor information to the vehicle 100. In addition, the terminal communication unit 210 may transmit a location of the user terminal 200 to the vehicle 100.

To this end, the terminal communication module 210 may include various local area communication modules, such as a Bluetooth module, an infrared communication module, an RFID communication module, a WLAN communication module, an NFC communication module, and a Zigbee communication module, which transmit and receive a signal using a wireless communication network in a local area. For example, the communication module 110 may be described as the Bluetooth module.

For example, the communication module 110 may be implemented as a Bluetooth module based on Bluetooth 4.0 (BLE). The communication module 110 may communicate with the vehicle 100 using a radio frequency. In this case, the terminal communication unit 210 may transmit a search signal to the vehicle 100. Here, the search signal may be an advertising packet. However, the present disclosure is not limited thereto.

Furthermore, the terminal communication unit 210 may also receive various signals including a response signal and a termination signal from the vehicle 100.

To this end, the terminal communication unit 210 may include a wireless communication interface including an antenna and a receiver, which receives at least one of the response signal and the termination signal. In addition, the terminal communication unit 210 may further include a signal conversion module configured to demodulate an analog type wireless signal, which is received through the wireless communication interface, into a digital control signal.

The input 240 may be provided to receive various commands from a user. The input 240 may receive a learning command from the user. Here, the learning command means a command for generating a learning pattern for movement of the user terminal 200.

Information transmitted by the sensor 230 and the input 240 may be utilized as a control basis of the terminal controller 220.

The terminal controller 220 may generate sensor information based on movement of the user which is sensed by the sensor 230. Specifically, the terminal controller 220 may generate sensor information including at least one of direction information and speed information of the user terminal 200 based on a moving direction, moving speed, acceleration, and the like of the user.

Alternatively, the terminal controller 220 may receive sensor information sensed by the sensor 230.

The terminal controller 220 may transmit the acquired sensor information to the vehicle 100. When the terminal controller 220 receives a response signal corresponding to a search signal from the vehicle 100, the terminal controller 220 may transmit the acquired sensor information to the vehicle 100. In this case, the response signal may be a response signal for requesting sensor information.

In addition, the terminal controller 220 may transmit the acquired sensor information to the vehicle 100 together with the search signal and may transmit the sensor information separately from the search signal.

Furthermore, the terminal controller 220 may identify the location of the user terminal 200 based on the search signal and may transmit the identified location of the user terminal 200 to the vehicle 100. Specifically, the terminal controller 220 may identify the location of the user terminal 200 based on an AOD of the search signal. The terminal controller 220 may control the terminal communication unit 210 to transmit the identified location of the user terminal 200 to the vehicle 100.

When the terminal controller 220 receives the response signal, the controller 220 may turn on the sensor 230 and may control the sensor 230 to sense movement of a user.

The terminal controller 220 may generate a learning pattern based on the movement of the user, and the generated learning pattern may be stored in a separate storage (not shown). In this case, the learning pattern may mean a feature which is repeated with respect to a parameter value indicating movement of the user, i.e., movement of the user terminal 200 during a preset time interval.

When a learning command is input by the input 240, the terminal controller 220 may generate a learning pattern based on movement of the user, which is sensed for a predetermined time, and may store the generated learning pattern in the separate storage.

In this case, the terminal controller 220 may sense movement of the user for each specific situation and may store a learning pattern generated for each situation.

For example, the terminal controller 220 may present a specific situation, such as "walking while operating the user terminal," "walking and putting the user terminal in a pocket," or "walking and holding the user terminal in a hand" to the user. When the user acts according to the presented situation, the terminal controller 220 may sense movement of the user for a predetermined time and may generate a behavior pattern for each situation based on the sensed movement. The terminal controller 220 may store the generated behavior pattern for each situation in the storage (not shown).

Alternatively, when the terminal controller 220 receives a response signal from the vehicle 100, the terminal controller 220 may sense movement of the user for a predetermined time. The terminal controller 220 may also generate a behavior pattern based on the movement of the user, which is sensed for the predetermined time.

The terminal controller 220 may confirm whether the generated learning pattern matches the sensed movement. In this case, when similarity between the sensed movement of the user and parameter values included in the learning pattern is greater than or equal to a predetermined reference value, the terminal controller 220 may confirm that the sensed movement matches the learning pattern.

When the sensed movement matches the learning pattern, the terminal controller 220 may generate sensor information based on the learning pattern. In this case, the terminal controller 220 may predict a direction of the user based on the parameter value included in the learning pattern and may generate sensor information including predicted direction information.

Alternatively, when the sensed movement does not match the learning pattern, the terminal controller 220 may generate sensor information based on the sensed movement. In this case, the terminal controller 220 may acquire a direction or speed of the user based on the sensed movement and may generate sensor information including such direction information or speed information.

The terminal controller 220 may transmit the generated sensor information to the vehicle 100 so that the vehicle 100 may utilize the transmitted sensor information as a control basis for determining whether the location of the user terminal 200 is valid. When a termination signal is received from the vehicle 100, the terminal controller 220 may turn off the sensor 230. The terminal controller 220 may turn off the sensor 230 to stop transmission of a search signal for a location identification or sensor information.

To this end, the terminal controller 220 may be implemented using a memory (not shown) configured to store data on an algorithm for controlling operations of components in the vehicle 100 or store data on a program for reproducing an algorithm, and a processor (not shown) configured to execute the above-described operation using the data stored in the memory. In this case, each of the memory and the processor may be implemented as a separate chip. Alternatively, the memory and the processor may be implemented as a single chip.

At least one component may be added or deleted according to performances of the above-described components of the vehicle 100 and the user terminal 200. In addition, it will be obvious to one of ordinary skill in the art that mutual locations of the components may be changed according to performance or a structure of a system.

Some components illustrated in FIG. 3 may be software and/or hardware components such as field programmable gate arrays (FPGAs) and application specific integrated circuits (ASICs).

Figure 4:
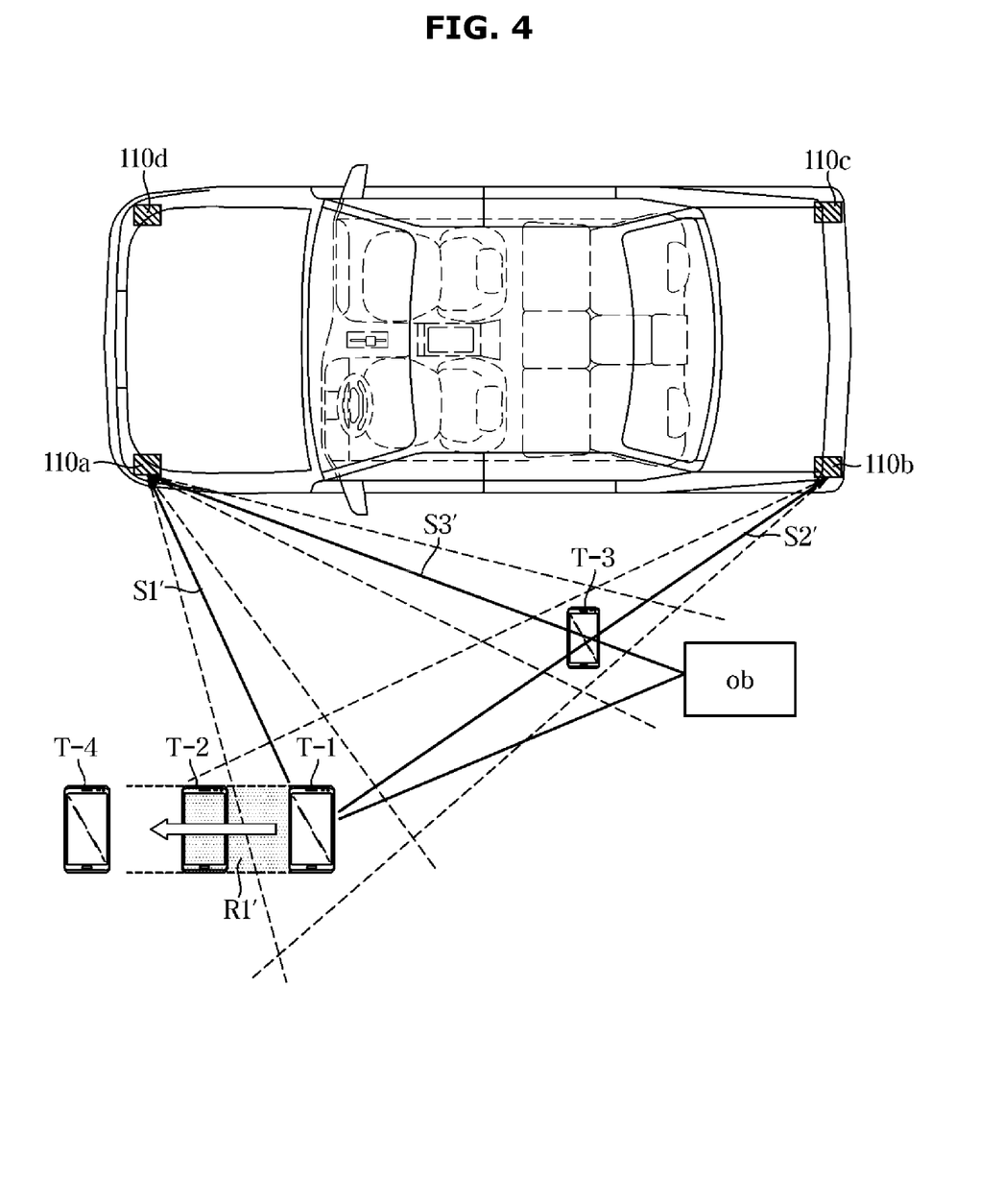
FIG. 4 is a diagram illustrating operation of a vehicle in one form of the present disclosure.

FIG. 4 is a diagram illustrating operation of a vehicle in accordance with one embodiment.

Referring to FIG. 4, a vehicle 100 according to one embodiment may include a plurality of communication modules 110a, 110b, 110c, and 110d.

Each of the plurality of communication modules 110a, 110b, 110c, and 110d may receive a first search signal from a user terminal 200, and a controller 120 may identify a first location of the user terminal 200 based on the first search signal.

In addition, a controller 120 may identify a second location of the user terminal 200, which corresponds to a second search signal based on the second search signal.

In this case, the controller 120 may identify a location of the user terminal 200 based on an AOA of each of the search signals.

The controller 120 may determine whether the identified location of the user terminal 200 is valid, i.e., whether the identified location is noise. The controller 120 may determine whether the location of the user terminal 200 is valid based on a reference location and sensor information. In this case, the reference location may be the location of the user terminal 200, which is determined to be valid above, and may mean a location of the user terminal 200, which is primarily identified.

Specifically, the controller 120 may set the primarily identified first location of the user terminal 200 as the reference location and may determine whether the second location of the user terminal 200 is valid based on the first location and the sensor information.

To this end, the controller 120 may determine displacement of the second location relative to the first location and may determine whether the second location is valid based on the displacement of the second location and the sensor information.

In this case, the displacement may mean a change amount of a location and may be information having at least one of size information and direction information. The displacement of the second location relative to the first location may include at least one of a direction in which the second location is moved with respect to the first location and a distance in which the second location is moved with respect to the first location.

The controller 120 may confirm whether a direction of the displacement of the second location matches the sensor information and may determine whether the second location is valid based on a confirmation result.

When the direction of the displacement of the second location does not match direction information included in the sensor information, the controller 120 may determine that the second location is not valid. That is, the controller 120 may determine that the second location is noise and may exclude the second location from estimating of the location of the user terminal 200, which corresponds to the second search signal.

When the direction of the displacement of the second location matches the direction information included in the sensor information, the controller 120 may determine that the second location is valid. The controller 120 may determine the second location as a final location of the user terminal 200 and may confirm a distance between the vehicle 100 and the user terminal 200 based on the final location of the user terminal 200.

In addition, the controller 120 may confirm whether a size of the displacement of the second location matches the sensor information and may determine whether the second location is valid based on a confirmation result.

To this end, the controller 120 may set the size of the displacement of the second location, i.e., a range of a distance by which the second location is moved from the first location based on speed information included in the sensor information. When the size of the displacement of the second location is within the set range, the controller 120 may confirm that the size of the displacement of the second location matches the sensor information.

That is, as the speed information included in the sensor information has a high speed value, the controller 120 may set a range in which the second location exists with respect to the first location as being wide. Alternatively, as the speed information included in the sensor information has a lower speed value, the controller 120 may set the range in which the second location exists with respect to the first location as being narrow.

When it is confirmed that the size of the displacement of the second location does not match the speed information included in the sensor information, i.e., when the size of the displacement of the second location is not within the set range based on the speed information, the controller 120 may determine that the second location is noise. That is, the controller 120 may determine that the second location is not valid and may exclude the second location from estimating the location of the user terminal 200, which corresponds to the second search signal.

When it is confirmed that the size of the displacement of the second location matches the speed information included in the sensor information, the controller 120 may determine that the second location is valid. The controller 120 may determine the second location as a final location of the user terminal 200 and may confirm a distance between the vehicle 100 and the user terminal 200 based on the final location of the user terminal 200.

For example, the controller 120 may identify a first location T-1 of the user terminal 200 based on first search signals S1' and S2' and may determine the first location T-1 to be a reference location.

After that, the controller 120 may identify a second location T-2 of the user terminal 200 based on a second search signal received from the user terminal 200.

In this case, when sensor information includes direction information in a left direction, the controller 120 may determine that a direction of displacement of the second location T-2 relative to the first location T-1 matches the sensor information and may determine that the second location T-2 is valid.

Here, an error range R1' for identifying the location of the user terminal 200 corresponding to the second search signal may be a narrower range, and a more accurate location of the user terminal 200 may be acquired.

In addition, the controller 120 may determine whether a third location T-3 identified based on a third search signal is valid. The controller 120 may determine that the third location T-3 located on the right with respect to the first location T-1 is not valid. That is, the controller 120 may determine that the third location T-3 is noise.

In another example, when sensor information includes speed information having a low speed value, the controller 120 may determine that a size of displacement of a fourth location T-4 relative to the first location T-1 is not within a range set based on the speed information. The controller 120 may determine that the fourth location T-4, which is farther away from the first location T-1 than a predetermined distance, is not valid. That is, the controller 120 may determine that the fourth location T-4 is noise.

As a result, an error range of a location estimated based on a search signal may be narrowed so that a more accurate location may be acquired. In addition, an accurate location may be acquired without increasing the number of the communication modules 110*a*, 110*b*, 110*c*, and 110*d*, thereby reducing costs.

Figure 5:
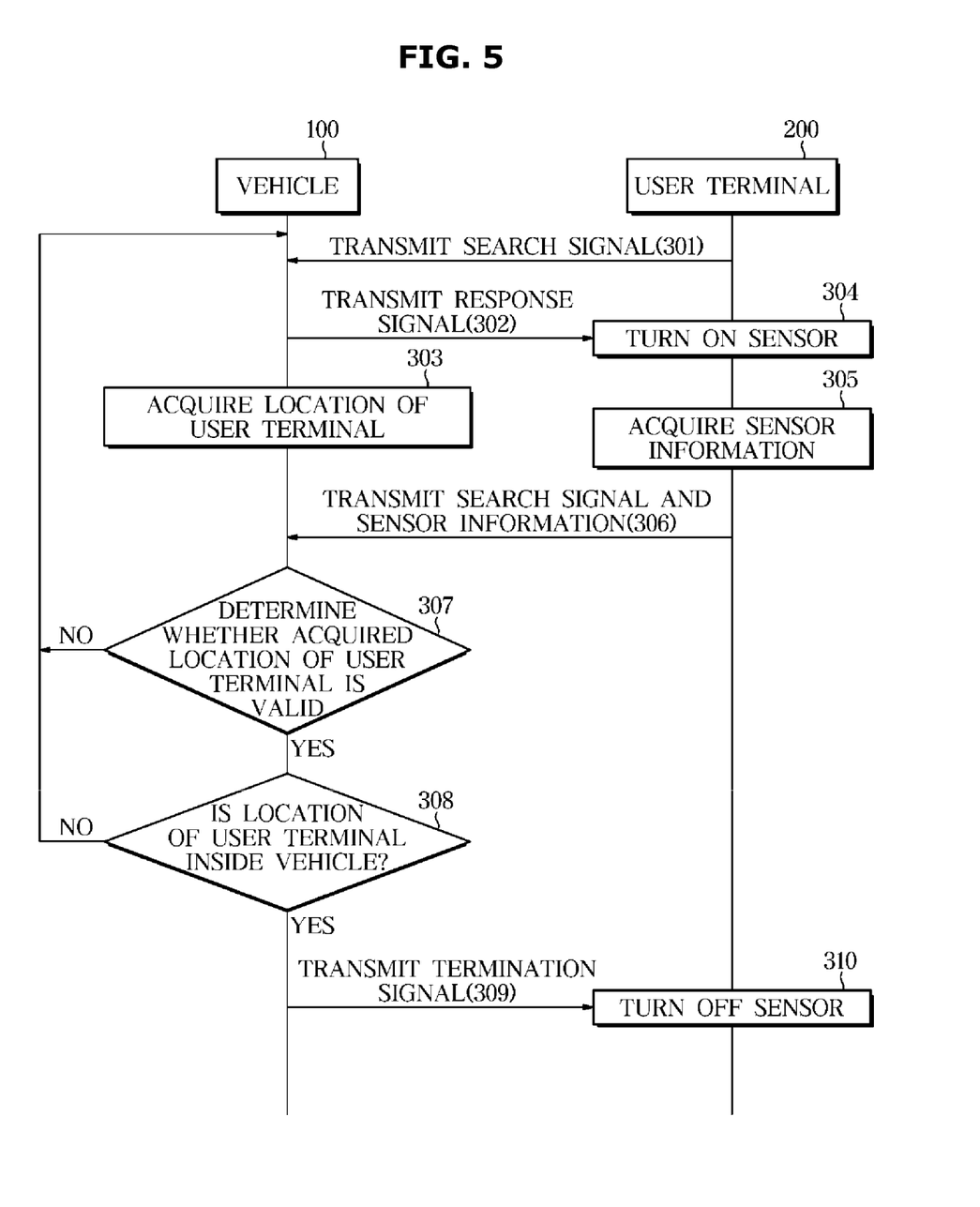
FIG. 5 is a flowchart illustrating a process of transmitting and receiving a signal between a vehicle and a user terminal in one form of the present disclosure.

FIG. 5 is a flowchart illustrating a process of transmitting and receiving a signal between a vehicle and a user terminal in accordance with one embodiment.

Referring to FIG. 5, a user terminal 200 in accordance with one embodiment may transmit a search signal to a vehicle 100 (301). In this case, the user terminal 200 may transmit the search signal to the vehicle 100 based on a predetermined period, and the search signal may be an advertising packet.

The vehicle 100 receiving the search signal may transmit a response signal corresponding to the search signal to the user terminal 200 (302). In this case, the response signal may be a response signal for requesting sensor information, and the sensor information may be information including at least one of direction information and speed information of the user terminal 200.

The vehicle 100 may acquire a location of the user terminal 200 based on the received search signal (303).

Specifically, the vehicle 100 may identify the location of the user terminal 200 based on an AOA of the received search signal and may acquire the location of the user terminal 200. In addition, the controller 120 may identify the location of the user terminal 200 using intensity, a TOA, and a TDOA of the search signal. The controller 120 may also identify the location of the user terminal 200 using a Zigbee, RFID, or GPS signal or the like.

For example, when the vehicle 100 identifies the location of the user terminal 200 based on the AOA of the search signal, the vehicle 100 may use a triangulation method to estimate the location of the user terminal 200.

Alternatively, the vehicle 100 may acquire the location of the user terminal 200 by receiving the location of the user terminal 200 from the user terminal 200. To this end, the user terminal 200 may identify the location of the user terminal 200 based on the search signal, and transmit the identified location of the user terminal 200 to the vehicle 100. In this case, the user terminal 200 may identify the location of the user terminal 200 based on an AOD of the search signal, but the present disclosure is not limited thereto. When the response signal transmitted from the vehicle 100 is received, the user terminal 200 may turn on a sensor 230 (304) and may acquire sensor information (305).

After that, the user terminal 200 may transmit the search signal and the sensor information to the vehicle 100 (306). The user terminal 200 may add sensor information to the search signal and may transmit the sensor information and the search signal to the vehicle 100. The user terminal 200 may separately transmit the sensor information and the search signal as separate signals.

When the sensor information is received, the vehicle 100 may determine whether the location of the user terminal is valid (307). The vehicle 100 may determine whether the location of the user terminal 200 acquired based on a reference location and the sensor information is valid, i.e., whether the acquired location of the user terminal 200 is noise.

In this case, the reference location may be a location of the user terminal 200 which is determined to be valid in advance and may mean a location of the user terminal 200 which is previously acquired.

Then, when it is determined that the acquired location of the user terminal 200 is valid (YES of 307), the vehicle 100 may confirm whether the location of the user terminal 200 is inside the vehicle 100 (308).

Specifically, when a distance between the vehicle 100 and the user terminal 200 which is confirmed based on the location of the user terminal 200 is less than a predetermined reference value, the vehicle 100 may confirm that the location of the user terminal 200 is inside the vehicle 100.

When it is confirmed that the location of the user terminal 200 is inside the vehicle (YES of 308), the vehicle 100 may transmit a termination signal to the user terminal 200 (309).

When the termination signal is received, the user terminal 200 may turn off the sensor 230 (310) and may stop the transmission of the search signal for a location identification or the sensor information.

As a result, the noise with respect to the location of the user terminal 200 may be removed based on the sensor information sensed by the user terminal 200. Therefore, an error range of a location estimated based on a search signal may be narrowed, and an accurate location may be acquired without increasing the number of installed communication modules, thereby reducing costs.

Figure 6:
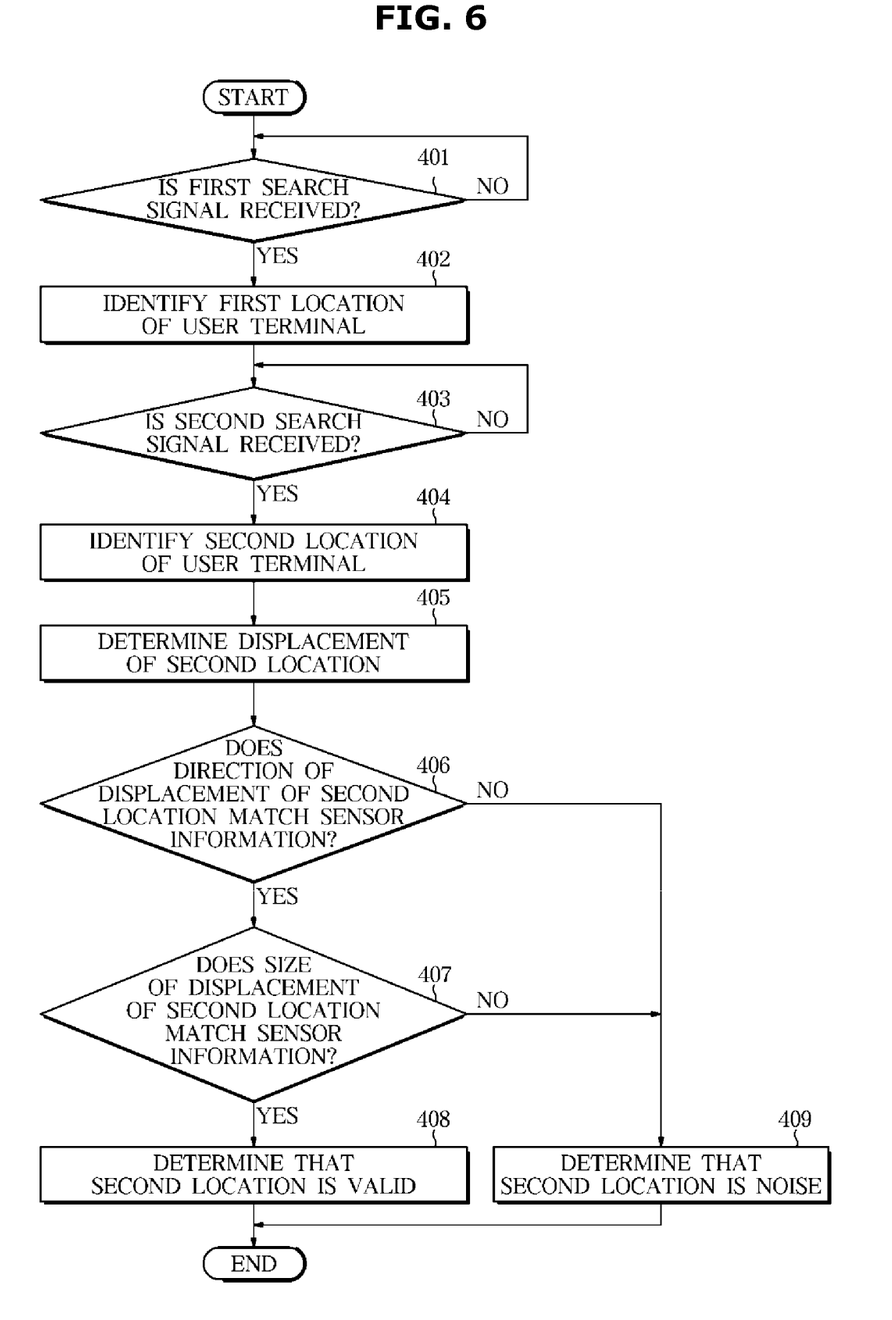
FIG. 6 is a flowchart of a controlling method of a vehicle in one form of the present disclosure.

FIG. 6 is a flowchart of a controlling method of a vehicle in accordance with one embodiment.

Referring to FIG. 6, a vehicle 100 in accordance with one embodiment may confirm whether a first search signal is received from a user terminal 200 (401).

When the first search signal is received (YES of 401), the vehicle 100 may identify a first location of the user terminal 200, which corresponds to the first search signal (402).

The vehicle 100 may confirm whether a second search signal is received from the user terminal 200 (403). When the second search signal is received (YES of 403), the vehicle 100 may identify a second location of the user terminal 200 which corresponds to the second search signal (404).

In this case, the vehicle 100 may receive a second search signal from the user terminal 200 according to a predetermined period, and the second search signal may be a search signal transmitted according to a next period after the first search signal is transmitted.

After that, the vehicle 100 may determine displacement of the second location relative to the first location of the user terminal 200 (405). In this case, the displacement may mean a change amount of a location and may be information having at least one of size information and direction information. The displacement of the second location relative to the first location may include at least one of a direction in which the second location is moved with respect to the first location and a distance in which the second location is moved with respect to the first location.

When the displacement of the second location relative to the first location is determined (405), the vehicle 100 may confirm whether a direction of the displacement of the second location matches sensor information (406).

Specifically, the vehicle 100 may confirm whether the direction of the displacement of the second location matches direction information included in the sensor information.

When the direction of the displacement of the second location matches the direction information included in the sensor information (YES of 406), the vehicle 100 may confirm whether the size of the displacement of the second location matches the sensor information (407).

To this end, the vehicle 100 may set the size of the displacement of the second location, i.e., a range of a distance by which the second location is moved from the first location based on speed information included in the sensor information. When the size of the displacement of the second location is within the set range, the vehicle 100 may confirm that the size of the displacement of the second location matches the sensor information.

When it is confirmed that the size of the displacement of the second location matches the speed information included in the sensor information (YES of 407), the vehicle 100 may determine that the second location is valid (408). That is, the vehicle 100 may confirm a distance between the vehicle 100 and the user terminal 200 based on the second location.

In another example, when the direction of the displacement of the second location does not match the direction information included in the sensor information (NO of 407), or when the size of the displacement of the second location does not match the speed information included in the sensor information (NO of 407), the vehicle 100 may determine that the second location is noise (409).

That is, the vehicle 100 may determine that the second location is not valid and may exclude the second location from estimating of the location of the user terminal 200, which corresponds to the second search signal.

As a result, an error range of a location estimated based on a search signal may be narrowed so that a more accurate location may be acquired. In addition, an accurate location may be acquired without increasing the number of communication modules, thereby reducing costs FIG. 7 is a flowchart illustrating operation of a user terminal in accordance with one embodiment.

Figure 7:
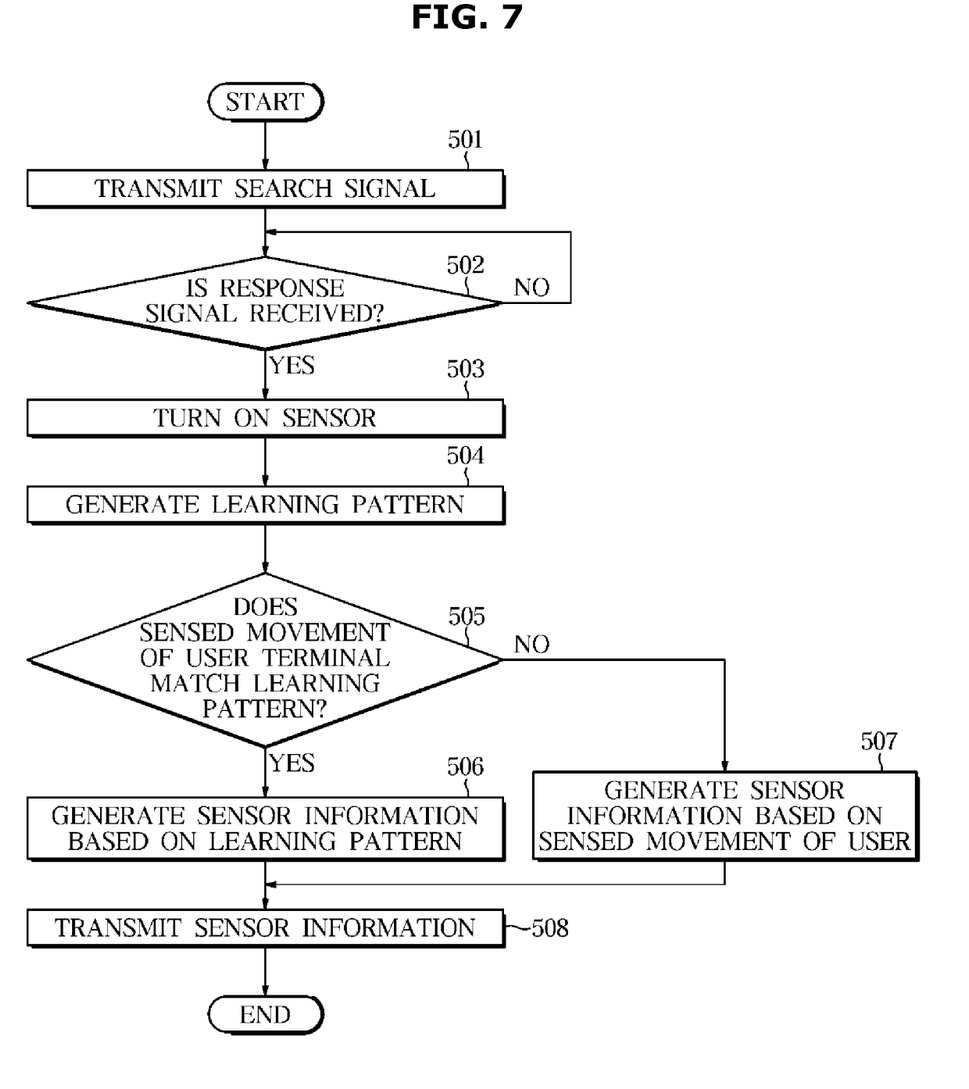
FIG. 7 is a flowchart illustrating operation of a user terminal in one form of the present disclosure.

Referring to FIG. 7, a user terminal 200 in accordance with one embodiment may transmit a search signal to a vehicle 100 (501). In this case, the user terminal 200 may transmit the search signal to the vehicle 100 based on a predetermined period, and the search signal may be an advertising packet.

When the search signal is transmitted, the user terminal 200 may confirm whether a response signal corresponding to the transmitted search signal is received (502). In this case, the response signal may be a response signal for requesting sensor information, and the sensor information may be information including at least one of direction information and speed information of the user terminal 200.

When it is confirmed that the response signal is received (YES of 502), the user terminal 200 may turn on a sensor 230 (503).

The user terminal 200 may sense movement of a user, that is, movement of the user terminal 200 through the sensor 230. The user terminal 200 may sense a moving direction, moving speed, acceleration, and the like of the user for a predetermined time through the sensor 230.

The user terminal 200 may generate a learning pattern based on the movement of the user which is sensed by the sensor 230 (504). In this case, the learning pattern may mean a feature which is repeated with respect to a parameter value indicating movement of the user, i.e., movement of the user terminal 200 during a preset time interval.

When the learning pattern is generated, the user terminal 200 may confirm whether the sensed movement of the user matches the learning pattern (505). In this case, when similarity between the sensed movement of the user and parameter values included in the learning pattern is greater than or equal to a predetermined reference value, the terminal controller 220 may confirm that the sensed movement matches the learning pattern.

When it is confirmed that the sensed movement matches the learning pattern (YES of 505), the user terminal 200 may generate sensor information based on the learning pattern (506). In this case, the user terminal 200 may predict a direction or speed of the user based on the parameter value included in the learning pattern and may generate sensor information including predicted direction information or speed information.

In another example, when it is confirmed that the sensed movement does not match the learning pattern (NO of 505), the user terminal 200 may generate sensor information based on the sensed movement (507). In this case, the user terminal 200 may acquire a direction or speed of the user based on the sensed movement and may generate sensor information including such direction information or speed information.

After that, the user terminal 200 may transmit the generated sensor information to the vehicle 100 (508). The sensor information may become a control basis by which the vehicle 100 estimates the location of the user terminal 200.

Accordingly, the user terminal 200 may generate a pattern of movement of the user so that sensor information suitable for each user may be generated. At the same time, since location estimation is performed based on such sensor information, the location of the user terminal 200 may be more accurately estimated.

Figure 8:
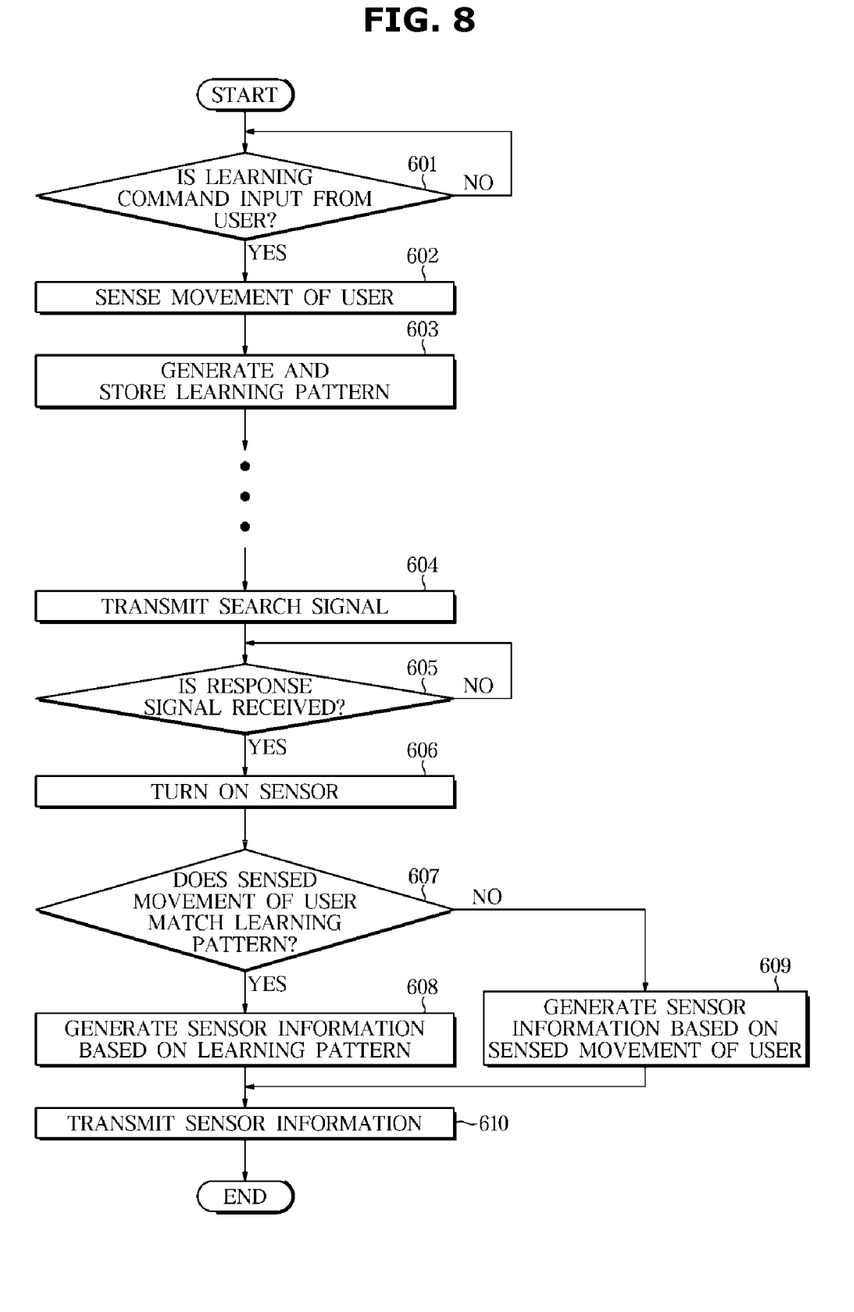
FIG. 8 is a flowchart illustrating operation of a user terminal in one form of the present disclosure.

FIG. 8 is a flowchart illustrating operation of a user terminal in accordance with another embodiment.

Referring to FIG. 8, a user terminal 200 in accordance with another embodiment may confirm whether a learning command is input from a user (601). Here, the learning command means a command for generating a learning pattern for movement of the user terminal 200.

When the learning command is input (YES of 601), the user terminal 200 may sense the movement of the user (602). The user terminal 200 may sense a moving direction, moving speed, acceleration, and the like of the user for a predetermined time. In this case, the user terminal 200 may sense movement of the user for each specific situation.

The user terminal 200 may generate a learning pattern based on the sensed movement of the user and may store the generated learning pattern (603). In this case, the learning pattern may mean a feature which is repeated with respect to a parameter value indicating movement of the user, i.e., movement of the user terminal 200 during a preset time interval.

In this case, the user terminal 200 may generate a learning pattern according to movement of the user, which is sensed for each specific situation and may store the learning pattern for each situation.

Thereafter, the user terminal 200 may transmit a search signal to the vehicle 100 (604). In this case, the user terminal 200 may transmit the search signal to the vehicle 100 based on a predetermined period, and the search signal may be an advertising packet.

When the search signal is transmitted, the user terminal 200 may confirm whether a response signal corresponding to the transmitted search signal is received (605). In this case, the response signal may be a response signal for requesting sensor information, and the sensor information may be information including at least one of direction information and speed information of the user terminal 200.

When it is confirmed that the response signal is received (YES of 605), the user terminal 200 may turn on a sensor 230 (606).

The user terminal 200 may sense movement of the user, that is, movement of the user terminal 200 through the sensor 230. The user terminal 200 may sense a moving direction, moving speed, acceleration, and the like of the user for a predetermined time through the sensor 230.

When the movement of the user is sensed, the user terminal 200 may confirm whether the sensed movement of the user matches a learning pattern (607). In this case, the learning pattern may mean a learning pattern which is previously stored and may mean the learning pattern which is stored in operation 603.

When similarity between the sensed movement of the user and parameter values included in the learning pattern is greater than or equal to a predetermined reference value, the user terminal 200 may confirm that the sensed movement matches the learning pattern.

When it is confirmed that the sensed movement matches the learning pattern (YES of 607), the user terminal 200 may generate sensor information based on the learning pattern (608). In this case, the user terminal 200 may predict a direction or speed of the user based on the parameter values included in the learning pattern and may generate sensor information including predicted direction information or speed information.

In another example, when it is confirmed that the sensed movement does not match the learning pattern (NO of 607), the user terminal 200 may generate sensor information based on the sensed movement (609). In this case, the user terminal 200 may acquire a direction or speed of the user based on the sensed movement and may generate sensor information including such direction information or speed information.

After that, the user terminal 200 may transmit the generated sensor information to the vehicle 100 (610). The sensor information may become a control basis by which the vehicle 100 estimates the location of the user terminal 200.

Accordingly, the user terminal 200 may generate a pattern of movement of the user so that sensor information suitable for each user may be generated. At the same time, since location estimation is performed based on such sensor information, the location of the user terminal 200 may be more accurately estimated.

Meanwhile, the disclosed embodiments can be implemented as recording media storing computer-executable instructions. The instructions can be stored in the form of a program code, and generate, when executed by a processor, a program module such that operation of the disclosed embodiments can be performed. The recording media can be implemented as computer-readable recording media.

The computer-readable recording media include all kinds of recording media in which instructions that can be interpreted by a computer are stored. Examples of the computer-readable recording media include a ROM, a RAM, a magnetic tape, a magnetic disc, a flash memory, an optical data storage device, and the like.

As is apparent from the above description, a vehicle and a controlling method in accordance with one aspect, it is possible to estimate a more accurate location of a user terminal.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
  a communication module configured to communicate with a user terminal; and
  a controller configured to:
    acquire a location of the user terminal corresponding to a search signal when the search signal is received from the user terminal; and
    determine, based on sensor information of the user terminal, whether the location of the user terminal is valid when the sensor information of the user terminal is received from the user terminal,
  wherein the controller is further configured to:
    acquire a first location of the user terminal corresponding to a first search signal received from the user terminal and a second location of the user terminal corresponding to a second search signal received from the user terminal;
    determine displacement of the second location of the user terminal against the first location of the user terminal;
    determine whether the second location of the user terminal is valid by comparing a direction or a size of the displacement of the second location of the user terminal with the sensor information; and
    determine that the second location of the user terminal is a noise when the direction of the displacement of the second location of the user terminal does not match the sensor information.

2. The vehicle of claim 1, wherein the sensor information includes at least one of direction information or speed information of the user terminal.

3. The vehicle of claim 1, wherein the controller is configured to identify the location of the user terminal based on an angle-of-arrival (AOA) of the search signal.

4. The vehicle according to claim 1, wherein:
  the communication module is configured to receive, from the user terminal, the location of the user terminal corresponding to the search signal; and
  the user terminal is configured to identify the location of the user terminal based on an angle-of-departure (AOD) of the search signal.

5. The vehicle of claim 1, wherein, when the search signal is received from the user terminal, the controller is configured to transmit, to the user terminal, a response signal for requesting for the sensor information.

6. The vehicle of claim 1, wherein the controller is configured to:
  acquire the first location of the user terminal corresponding to the first search signal when the first search signal is received from the user terminal; and
  acquire the second location of the user terminal corresponding to the second search signal when the second search signal is received from the user terminal.

7. The vehicle of claim 1, wherein, when a size of the displacement of the second location of the user terminal does not match the sensor information, the controller is configured to determine the second location of the user terminal as the noise.

8. The vehicle of claim 1, wherein, when it is determined that the location of the user terminal is valid and the location of the user terminal is inside the vehicle, the controller is configured to transmit, to the user terminal, a termination signal.

9. A controlling method of a vehicle comprising:
  receiving, from a user terminal, a search signal;
  acquiring a location of the user terminal corresponding to the search signal;
  receiving, from the user terminal, sensor information of the user terminal; and
  determining, based on the sensor information, whether the location of the user terminal is valid,
  wherein acquiring the location of the user terminal further comprises:
    identifying a first location of the user terminal corresponding to a first search signal received from the user terminal; and
    identifying a second location of the user terminal corresponding to a second search signal received from the user terminal, and
  wherein determining whether the location of the user terminal is valid further comprises:
    determining displacement of the second location of the user terminal against the first location of the user terminal;
    determining whether the second location of the user terminal is valid by comparing a direction or a size of the displacement of the second location of the user terminal with the sensor information; and
    when the direction or the size of the displacement of the second location of the user terminal does not match the sensor information, determining that the second location of the user terminal is a noise.

10. The controlling method of claim 9, wherein the method further comprises:
  when the search signal is received from the user terminal, transmitting, to the user terminal, a response signal for requesting for the sensor information.

11. The controlling method of claim 9, wherein acquiring the location of the user terminal comprises:
  identifying the location of the user terminal based on an angle-of-arrival (AOA) of the search signal.

12. The controlling method of claim 9, wherein acquiring the location of the user terminal comprises:
  receiving, from the user terminal, the location of the user terminal based on an angle-of-departure (AOD) of the search signal.

13. The controlling method of claim 9, wherein acquiring the location of the user terminal comprises:
  identifying a first location of the user terminal corresponding to a first search when the first search signal is received; and identifying a second location of the user terminal corresponding to a second search signal when the second search signal is received.

\* \* \* \* \*